United States Patent [19]

Bruderer

[11] Patent Number: 4,711,596
[45] Date of Patent: Dec. 8, 1987

[54] APPARATUS FOR SECURING A CONNECTION

[75] Inventor: Werner Bruderer, Zürich, Switzerland

[73] Assignee: Werkzeugmaschinenfabrik Oerlikon-Bührle AG, Zürich, Switzerland

[21] Appl. No.: 826,145

[22] Filed: Feb. 3, 1986

[30] Foreign Application Priority Data

Feb. 14, 1985 [CH] Switzerland .................. 665/85

[51] Int. Cl.⁴ .................................................. F16D 1/06
[52] U.S. Cl. ..................................... 403/348; 403/319
[58] Field of Search ............... 403/348, 349, 353, 354, 403/375, 378, 319, 316, 354, 97, 146, 328

[56] References Cited

U.S. PATENT DOCUMENTS

| Re. 30,801 | 11/1981 | Gley . | |
|---|---|---|---|
| 2,267,802 | 12/1941 | Purdy | 403/316 |
| 3,854,832 | 12/1974 | Cowper | 403/349 |
| 3,963,361 | 6/1976 | Schenk | 403/349 |
| 4,385,851 | 5/1983 | Bellamy | 403/406.1 |
| 4,459,785 | 7/1984 | Zimmer | 403/348 |
| 4,480,511 | 11/1984 | Nickipuck | 403/325 |
| 4,566,502 | 1/1986 | Kellogg | 403/328 X |
| 4,596,345 | 6/1986 | Beckers | 403/316 X |

FOREIGN PATENT DOCUMENTS

| 1023928 | 2/1958 | Fed. Rep. of Germany . | |
|---|---|---|---|
| 2527404 | 1/1976 | Fed. Rep. of Germany | 403/349 |
| 195403 | 7/1938 | Switzerland . | |
| 2069109 | 8/1981 | United Kingdom . | |

Primary Examiner—Randolph A. Reese
Assistant Examiner—Peter M. Cuomo
Attorney, Agent, or Firm—Werner W. Kleeman

[57] ABSTRACT

When installing security devices for securing releasable connections against unintentional release, the danger exists that during the assembly or erection of a machine, the installation of such security devices may be forgotten without such being noticed. To prevent this from happening, the invention contemplates using a securing or security element which, for instance, in the case of a rotary connection between a bolt member in a housing, is displaceably guided in a groove or groove structure of such housing. This securing or security element engages or latches, under the action of the force of a spring, in a groove or groove structure of the bolt member after the bolt member has been inserted into the housing, and in this way there is automatically secured the desired connection.

7 Claims, 3 Drawing Figures

APPARATUS FOR SECURING A CONNECTION

BACKGROUND OF THE INVENTION

The present invention relates to a new and improved construction of an apparatus for securing or ensuring for the security of a connection, especially a so-called rotary or rotational connection with a housing.

In its more particular aspects, the security or safety apparatus of the present development is of the type wherein a bolt member or bolt is inserted into the housing and is attached to the housing by rotating such bolt member through a predetermined angle, and the security or safety apparatus precludes unintentional dropping out or release of the bolt member from the housing.

There are known to the art, for instance, washers or underlay discs for securing threaded connections. These washers or underlay discs contain a number of tongue members or tabs. One tongue or tab of such plurality of tongue members or tabs is bent into a recess of the threaded member or bolt or the like and another tongue member or tab is bent into a recess in the housing in such a manner that the threaded member or bolt is no longer able to rotate in relation to the housing.

These heretofore known securing or safety apparatuses are afflicted with the drawback that they can be easily forgotten during the assembly or erection of a machine, that is to say, if during the assembly or erection of the machine, the aforementioned tongue members or tabs are not bent into their related recesses, then the security apparatus fails and the threaded member or bolt can unintentionally loosen.

SUMMARY OF THE INVENTION

Therefore, with the foregoing in mind, it is a primary object of the present invention to provide a new and improved construction of a security or safety apparatus for reliably securing a connection and which does not exhibit the aforementioned drawbacks and limitations of the prior art constructions.

Another important object of the present invention aims at the provision of a new and improved construction of a security or safety apparatus, which does not exhibit the aforementioned shortcomings and wherein the part or component to be secured, following its installation or mounting, can be reliably and positively secured in position without having to resort to any additional measures and such part or component cannot undesirably loosen or detach.

Yet a further significant object of the present invention aims at providing a new and improved construction of a security or safety apparatus of the character described, wherein the part or component which has been reliably secured can also again be released without the need to resort to additional measures whenever it is desired to release or loosen such part or component.

Now in order to implement these and still further objects of the invention, which will become more readily apparent as the description proceeds, the security or safety apparatus of the present development is manifested by the features that a securing or security element is displaceably guided in a groove or groove means of the housing and protrudes under the action of the force of a spring or spring means into a groove or groove means of the bolt member. An actuation or operating pin or the like is preferably attached at the securing or security element for displacing such securing or security element against the force of the spring.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
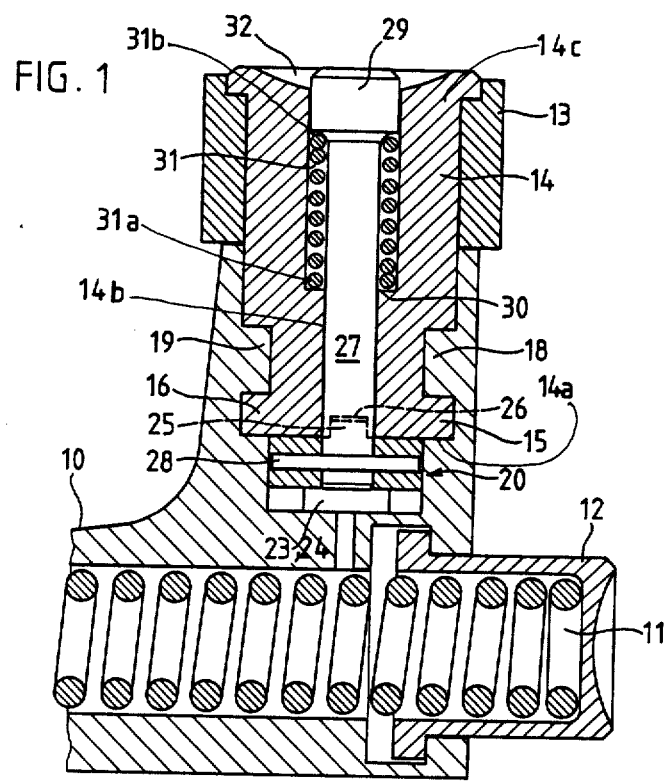
FIG. 1 is a fragmentary longitudinal sectional view through an exemplary embodiment of the inventive security or safety apparatus.

Describing now the drawings, it is to be understood that to simplify the showing thereof, only enough of the structure of the security or safety apparatus for securing a connection has been illustrated therein as is needed to enable one skilled in the art to readily understand the underlying principles and concepts of the present invention. Turning now specifically to FIG. 1 of the drawings, there is shown therein a rear housing part or housing 10 of a breechblock of a Gatling gun, the construction of which is not of any further importance in terms of the actual teachings of the present invention and therefore need not be here further considered. In this rear housing part 10, there is located a spring 11 which serves for the displacement of a not particularly illustrated but conventional firing pin. This spring 11 bears against a substantially pot-shaped cover member 12 which is secured in the rear housing part or housing 10.

Furthermore, at the rear housing part or housing 10, a guide roll or roller 13 is rotatably mounted upon a bolt member or bolt 14. This bolt member 14 is secured in the rear housing part or housing 10 by rotating such bolt member 14 through an angle of 90° about its lengthwise axis. For this purpose, the bolt member 14 is provided at its lower end 14a, defining one of two oppositely situated surfaces, with two diametrically oppositely situated segments 15 and 16 which bear at related or corresponding segments 18 and 19 provided internally of the rear housing part or housing 10. In the position of the bolt member 14 as depicted in FIG. 1, the segments or segment members 15 and 16 of such bolt member 14 are retained by the segments or segment members 18 and 19 of the rear housing part or housing 10. The guide roll or roller 13 is able to rotate upon the bolt member 14.

The security or safety apparatus described hereinafter is assigned the task of preventing the bolt memler 14 from rotating within the rear housing part or housing 10 and from unintentionally dropping out of or releasing from such rear housing part or housing 10. This security or safety apparatus possesses a securing or security element 20 which engages by means of two arms or arm members 21 and 22 into grooves or groove means 23 and 24 of the rear housing part or housing 10. Two ribs or rib members 25 engage in a respective or related groove or groove member 26 provided at the lower end or end surface 14a of the bolt member 14. In the illustration of FIG. 1, there is only visible, however, one of the ribs or rib members 25. Since the two arms or arm members 21 and 22, which are located diametrically opposite one another, engage with the grooves 23 and 24, respectively, the securing or security element 20 is unable to rotate, and since both of the ribs or rib members 25, which likewise are situated diametrically opposite one another, engage into the grooves or groove means 26 of the bolt member 14, this bolt member 14 also cannot rotate. Continuing, it will further observed that an actuation or operating pin 27 is secured to the securing or security element 20 with the aid of a securing or fastening pin 28 or equivalent structure.

Figure 2:
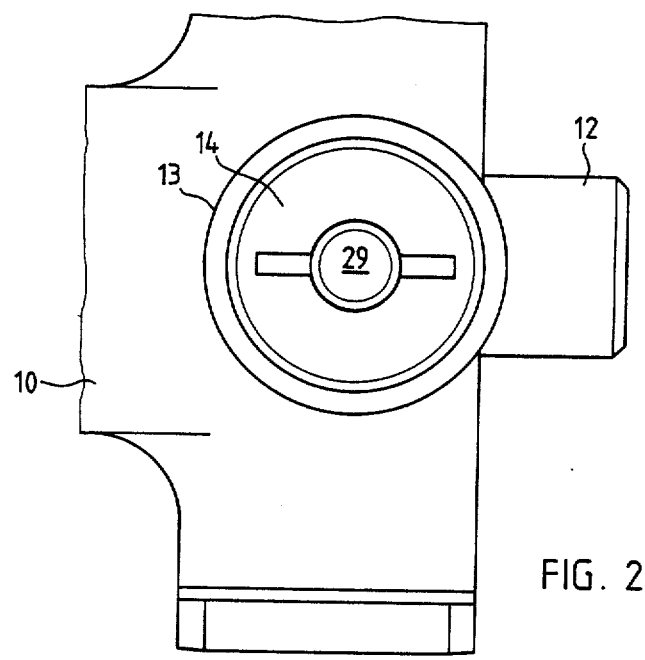
FIG. 2 is a top plan view of the security or safety apparatus depicted in FIG. 1.
Figure 3:
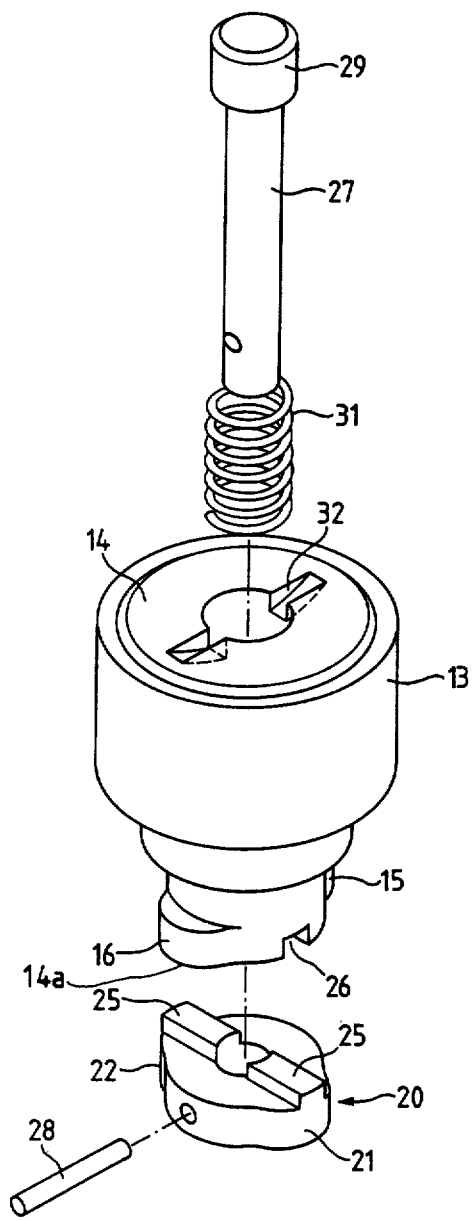
FIG. 3 is a perspective and exploded view portraying individual parts of the security or safety apparatus depicted in FIG. 1.

The actuation or operating pin 27 possesses a head portion or head 29 at its upper end, as best seen by referring to FIGS. 1 and 3, and this actuation or operating pin 27 protrudes through a stepped axial bore 14b of the bolt member 14. This stepped axial bore 14b of the bolt member 14 possesses a shoulder 30 against which bears a spring or spring member 31 at its one lower end 31a. The other upper end 31b of the spring member 31 bears against the head 29 of the actuation or operating pin 27. This spring 31 strives to upwardly displace or press the actuation or operating pin 27 together with the securing or security element 20 until the ribs 25 of the securing or security element 20 engage with the grooves or groove means 26 of the bolt member 14. This bolt member 14 is provided at its upper end 14c, defining the other one of its oppositely situated surfaces, with a slot or groove 32 into which protrudes the head 29 of the actuation or operating pin 27, as also best seen by referring to FIG. 2. Through the provision of the slot or groove 32 it is possible to rotate the bolt member 14 within the rear housing part or housing 10, for instance, through the use of a suitable tool such as, for instance, a screwdriver. During such operation, the screwdriver acts against the head or head portion 29 of the actuation or operating pin 27, with the result that such actuation or operating pin 27 and the securing (or security) element 20 are downwardly pressed. As soon as the ribs or rib members 25 are no longer in engagement with the grooves or groove means 26, it is possible to rotate the bolt member 14.

The mode of operation of the described security or safety apparatus is as follows:

Before the bolt member 14 can be inserted into the rear housing part or housing 10, care must be taken to ensure that the rotatable securing or security element 20 which is attached a as aforedescribed to the bolt member 14, is rotated such that the ribs or rib members 25 are disposed transversely to the grooves 26 located at the lower end surface or lower end 14a of the bolt member 14. Thereafter, the bolt member 14 can be inserted into the rear housing part or housing 10, and the arm or arm members 21 and 22 of the securing or security element 20 protrude into the grooves 23 and 24 of the rear housing part or housing 10, so that the securing or security element 20 no longer can be rotated. Now if the bolt member 14 is turned or rotated through 90°, then such bolt member 14 also rotates relative to the securing or security element 20 until the ribs or rib members 25 engage with the grooves or groove means 26 of the bolt member 14, as is apparent by inspecting FIG. 1. Consequently, the head 29 of the actuation or operating pin 27 also protrudes into the slot or groove 32 of the bolt member 14 and such bolt member 14 is secured in place. To release the connection of the bolt member 14, a suitable tool, such as the aforementioned screwdriver, is inserted into the slot 32. As a result, the actuation or operating pin 27 together with the securing or security element 20 are downwardly displaced against the force of the spring or spring means 31, and the ribs or rib members 25 of the securing or security element 20 are pressed out of the grooves 26 of the bolt member 14 and such bolt member 14 can freely rotate and be removed from the rear housing part or housing 10.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. An apparatus for ensuring for the security of a connection, especially a rotary connection, with a housing, comprising:

a bolt member inserted into said housing and having a lower situated surface;

said bolt member being connected with said housing by rotating said bolt member through a predetermined angle;

said security apparatus preventing the bolt member from unintentionally releasing itself from the housing upon unintentional rotation of said bolt member and said housing with respect to one another at said lower situated surface;

said housing being provided with groove means at said lower situated surface;

said bolt member being with groove means;

said security apparatus comprising a securing element displaceably guided in said groove means of said housing;

spring means for urging said securing element into engagement with said groove means of said bolt member;

an actuation pin;

means for connecting said actuation pin with said securing element; and said actuation pin serving for displacing the securing element against the force of said spring means.

2. The security apparatus as defined in claim 1, wherein:

said bolt member possesses an axial bore; and said actuation pin piercingly extending through said axial bore.

3. The security apparatus as defined in claim 2, wherein:

said bolt member possesses oppositely located end surfaces defining a first end surface and surface and a second end surface;

said groove means of said bolt member being located at said first end surface which defines said lower situated end surface;

slot means situated at said oppositely located second end surface of said bolt member;

said slot means at said oppositely located second end surface serving for the rotation of said bolt member; and said actuation pin protruding into said slot means.

4. The security apparatus as defined in claim 3, wherein:

said actuation pin has opposed ends;

said securing element being secured at one opposed end of said actuation pin by said connecting means;

a head provided at the other opposed end of said actuation pin;

said axial bore of said bolt member being provided with a shoulder;

said spring means having opposed ends; and said spring means bearing against said head of said actuation pin at one of said opposed ends thereof and bearing against said shoulder of said bore of said bolt member at the opposite opposed end thereof.

5. The security apparatus as defined in claim 4, wherein:

said securing element comprises two oppositely situated arm members;

said groove means of said housing comprising a pair of oppositely situated grooves into which protrude said two oppositely situated arm members;

said groove means of said bolt member comprises a pair of oppositely situated grooves; and said securing element comprising two oppositely situated rib members which protrude into said pair of oppositely situated grooves of said bolt member.

6. An apparatus for ensuring for the security of a connection, especially a rotary connection, with a housing, comprising:

a bolt member inserted into said housing and having a lower situated surface;

said bolt member being connected with said housing by rotating said bolt member through a predetermined angle;

said security apparatus preventing the bolt member from unintentionally releasing itself from the housing upon unintentional rotation of said bolt member and said housing with respect to one another;

said housing being provided with groove means;

said bolt member being provided with securing means at said lower situated surface;

said security apparatus comprising a securing element displaceably guided in said groove means of said housing;

said securing element being provided with securing means engageable with said securing means of said bolt member in interlocking relationship when said bolt member is retained in said housing in a manner preventing said unintentional release of said bolt member and said housing;

said securing means of said bolt member and said securing means of said securing element extending transversely with respect to one another upon insertion of said bolt member into said housing;

said securing means of said bolt member and said securing means of said securing element extending essentially in the same direction when said bolt member and said housing are connected to one another in a manner preventing unintentional release of said housing and said bolt member from one another; and spring means for urging said securing means of said securing element into interfitting engagement with said securing means of said bolt member.

7. A security apparatus for ensuring the security of a connection, especially a rotary connection, comprising the combination of:

a housing;

said housing being provided with groove means;

said groove means of said housing comprising a pair of oppositely situated grooves;

a bolt member inserted into said housing and connected with said housing by rotating said bolt member through a predetermined angle;

said bolt member possessing oppositely located end surfaces defining a first end surface and a second end surface;

said bolt member possessing an axial bore provided with a shoulder;

said bolt member being provided with groove means comprising a pair of oppositely situated grooves located at the first end surface;

said bolt member being provided with slot means situated at said oppositely located second end surface;

said slot means serving for enabling rotation of said bolt member;

said security apparatus preventing the bolt member from unintionally releasing from the housing;

said security apparatus comprising a security element displaceably guided in said groove means of said housing;

said securing element comprising two oppositely situated arm members;

said arm members protruding into said oppositely situated grooves of said housing;

said securing element being provided with two oppositely situated rib members which protrude into said pair of oppositely situated grooves of said bolt member;

spring means for urging said securing element into engagement with said groove means of said bolt member;

said spring means having opposed ends;

said spring means bearing against said shoulder of said bore of said bolt member at one of said opposed ends;

an actuation pin having opposed ends;

means for connecting said actuation pin at one opposed end with said securing element;

said actuation pin serving for displacing the securing element against the force of said spring means;

said actuation pin piercingly extending through said axial bore of said bolt member and protruding into said slot means of said bolt member;

a head provided at other opposed end of said actuation pin; and said spring means bearing against said head of said actuation pin at the opposite end thereof.

* * * * *

UNITED STATES PATENT AND TRADEMARK OFFICE
CERTIFICATE OF CORRECTION

PATENT NO. : 4,711,596
DATED : December 8, 1987
INVENTOR(S) : WERNER BRUDERER

It is certified that error appears in the above-identified patent and that said Letters Patent is hereby corrected as shown below:

Column 2, line 58, please delete "memler" and insert --member--

Column 3, line 10, after "further" please insert --be--

Column 3, line 49, please delete "a"

Column 4, line 33, after "being" please insert --provided--

Column 4, line 53, please delete "and surface"

Column 6, line 28, please delete "unintionally" and insert --unintentionally--

Signed and Sealed this

Seventh Day of June, 1988

*Attest:*

DONALD J. QUIGG

*Attesting Officer*   *Commissioner of Patents and Trademarks*